April 22, 1952 C. H. HOEPPNER 2,593,452

SCALE-OF-THREE ELECTRONIC SWITCH

Filed Oct. 25, 1945 2 SHEETS—SHEET 1

Inventor

CONRAD H. HOEPPNER

By Ralph L Chappell

Attorney

April 22, 1952 C. H. HOEPPNER 2,593,452

SCALE-OF-THREE ELECTRONIC SWITCH

Filed Oct. 25, 1945 2 SHEETS—SHEET 2

Inventor

CONRAD H. HOEPPNER

By Ralph L Chappell

Attorney

Patented Apr. 22, 1952

2,593,452

UNITED STATES PATENT OFFICE 2,593,452

SCALE-OF-THREE ELECTRONIC SWITCH

Conrad H. Hoeppner, Washington, D. C.

Application October 25, 1945, Serial No. 624,630

10 Claims. (Cl. 250—27)

(Granted under the act of March 3, 1883, as amended April 30, 1928; 370 O. G. 757)

This invention relates in general to electronic control circuits and in particular to apparatus for the counting or frequency division of electrical impulses.

Prior art has provided a wide variety of electronic counters capable of response to successive units at speeds which render any mechanical counter useless, or at best, inaccurate. Perhaps the earliest stimulus given to the development of electronic counters was the need arising from radio-activity investigations for a means of recording the impulses from Geiger-Müller counters and from ionization chambers used with amplifiers. These devices were actuated by radioactive substances, the radiations given off causing them to generate electrical impulses. The rate of electrical impulse generation was extremely high in terms of mechanical counters and the electronic counter has constituted a widely used solution of the problem. Other electronic counter functions, of which there are many, include determination of projectile velocity, frequency division, and frequency metering.

Heretofore, the principal electronic counter developments embodying hard vacuum tubes have taken some form of the basic Eccles-Jordan trigger circuit. Such forms comprise one or more states of two vacuum tubes each. The output of each tube in the stage is connected to the input of the other tube so as to employ the principle of regenerative triggering action. Any number of such stages may be cascaded to provide a chain counter so as to increase the total count. Likewise any number of stages may be cascaded to provide a closed ring counter. The chain counter is of the scale-of-two variety having a total count of $2^n$ where $n$ is the total number of stages. The total count (unless a resetting means is employed) is always some power of two. The ring counter, having the input impulse applied to all stages in parallel, has a count equal to the total number of stages and the count may, accordingly, have any arbitrary integral value. As between the chain form and the ring form, the chain form is obviously the most economical of vacuum tubes since it yields for a total of $2n$ tubes a count, or scaling ratio, of $2^n$ whereas the ring counter, composed as described, yields for a total of $2n$ tubes only a count of $n$. The limit in tube economy approached by counters of the $m^n$ type, where $m$ equals the count per stage as well as the number of tubes per stage, and $n$ is the number of stages, is $e^n$, where $e$ is the base of natural logarithms. Since $m$ must be integral, it will be seen that a counter of the scale-of-three type having three tubes per stage, i. e., $3^n$, will more closely approach the limit $e^n$ than will $2^n$.

It is an object of this invention to provide an electronic counter of the scale-of-three type.

It is another object of this invention to provide an electronic counter of the type having a scaling ratio of $m^n$, having a scaling ratio of $3^n$, where $m$ is the number of tubes per stage as well as the scaling ratio per stage and $n$ is the number of stages.

It is another object of this invention to provide apparatus for the counting of electrical impulses which produces, for any given number of vacuum tubes employed, an increase in total count as compared to conventional scale-of-two counters.

Other objects and features of this invention will become apparent upon a careful consideration of the following detailed description when taken together with the accompanying drawings in which.

Figure 1:
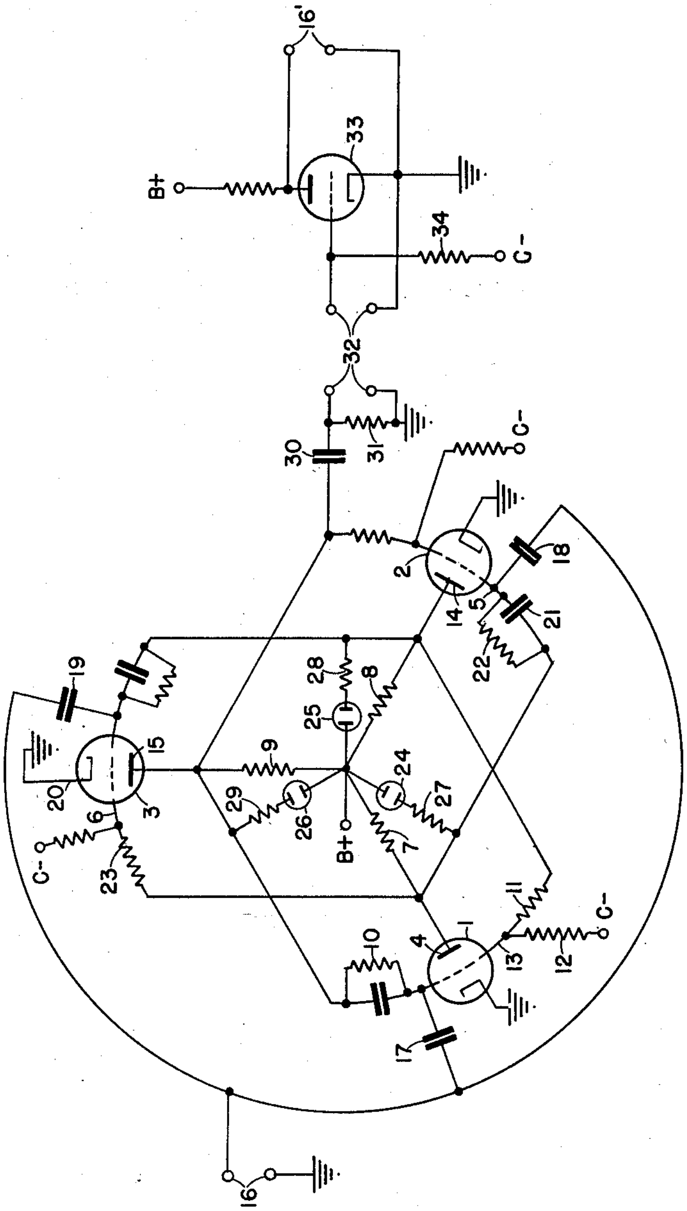
Fig. 1 is the circuit diagram of one embodiment of this invention.

This invention is based on the principle that a circuit having three distinct states of stability, into any one of which it tends to move upon being energized with substantially equal readiness, may, by application of an external influence, be caused to move into a selectable one of its three states. Such a circuit is shown in Fig. 1 in which vacuum tubes 1, 2, and 3 are symmetrically arranged in an electrical sense. If a start is made at tube 1 and the circuit is traced in a counter-clockwise direction (for example) it will be seen that the output of tube 1, i. e., the circuit of anode 4, is connected to the input of tube 2, i. e., the circuit of grid 5 of that tube. Similarly, the output of tube 2 is successively connected to the input of tube 3 and the output of tube 3 is successively connected to the input of tube 1 to form a closed ring of cascaded amplifier tubes. Likewise, if the retrogressive connections are traced, it will be found that the output of tube 1 at anode 4 is connected to the input of tube 3 at grid 6, the output of tube 3 is retrogressively connected to the input of tube 2, and the output of tube 2 is retrogressively connected to the input of tube 1 to form a closed ring of cascaded amplifier tubes in a sense opposite to that formed by the original counter-clockwise circuit tracing. This arrangement comprises three vacuum tubes each of which is coupled regeneratively to each of the other tubes to form a closed ring of regeneratively coupled amplifier tubes. In Fig. 1 circuit components associated with each of tubes 1, 2 and 3 which perform the same functions are substantially the same. For example, resistor 7 in the anode circuit of tube 1 is substantially the same as resistor 8 in the anode circuit of tube 2 and resistor 9 in the anode circuit of tube 3. The tubes themselves have substantially the same characteristics so as to preserve the symmetry of the circuit. The resistors which determine the grid potentials of the tubes have been chosen of such a value and B+ and C− potentials have been chosen of such a value that, with the particular tubes chosen, any one tube is biased below cutoff potential when only one of the tubes to which its input is connected is conducting. Another way of saying this is that only that tube which has its input connected to the output of two non-conducting tubes may itself conduct. This arrangement is typified by Fig. 1 in which resistors 9 and 10 in series in parallel with resistors 8 and 11 in series all in series with resistor 12 between B+ potential and C− potential determine the potential of grid 13 of tube 1. Resistors 8, 9, 10, 11, and 12 have been chosen of such a value that, if either tube 2 or tube 3 is conducting, tube 1 will be biased below cutoff. It will be apparent that, from the symmetry of the circuit, there will be three distinct states which characterize the circuit. One of these will find tube 1 conducting and tubes 2 and 3 non-conducting. Another state will find tube 2 conducting and 1 and 3 cut off. The third possible state finds tube 3 conducting and 1 and 2 cut off. The ideal circuit, when energized, would tend to move toward all three states with equal readiness and a stalemate would result. As a practical matter, no such idealistic symmetry could be achieved and minor differences in circuit values must necessarily exist. Therefore, when the circuit is energized, one of the tubes will be so conditioned as to have a slightly greater tendency to conduct and, by virtue of the regenerative action of the input and output couplings provided, that particular tube will overpower the other two tubes and cause the circuit to move more readily into the state characterized by its conduction.

Let it be assumed that the circuit has been energized and has moved into the state in which tube 1 is conducting and tubes 2 and 3 are non-conducting. Anode 4 of tube 1 is at substantially ground potential while anode 14 of tube 2 and anode 15 of tube 3 are substantially at B+ potential all as determined by the conduction or non-conduction of the particular tube.

Now, let it be assumed that a sharp negative electrical impulse is applied at input terminals 16 and is communicated in parallel to the grids of tubes 1, 2, and 3 through capacitors 17, 18, and 19. This negative pulse, while directly reducing the flow of current in tube 1 has no such effect on tubes 2 and 3 which have been cut off prior to the pulse. For an instant, therefore, tubes 1, 2, and 3 are all cut off due to the input electrical impulse at terminals 16 from an external source. Anode 4 undertakes to rise immediately to B+ potential and in doing so undertakes to carry grid 6 of tube 3 above the potential of cathode 20. The flow of grid current aborts this undertaking and the potential grid 6 can rise above the potential of cathode 20 by only an insignificant amount. Thus, grid 6 of tube 3 tends to be brought up in potential to the same value enjoyed by grid 13 of tube 1 before the reception of the pulse and upon disappearance of the pulse tubes 1 and 3 tend to move toward conduction with substantially equal readiness. On the other hand, grid 5 of tube 2 is capacitively coupled by means of capacitor 21 to anode 4 and is held, by the necessity of charging capacitor 21 through the circuit resistances, to a potential more positive than that enjoyed by either grid 13 of tube 1 or grid 6 of tube 3. Upon the disappearance of the external pulse from terminals 16, the circuit tends to move into the one of its three stable states most favored by existing circuit conditions. The state most favored is the one in which tube 2 alone conducts.

If a second negative pulse be applied at terminals 16, the process is repeated except that tube 3 is placed in the conducting state and tubes 1 and 2 are cut off. If a third negative pulse be applied at terminals 16, the circuit will be driven into the state originally assumed, i. e., tube 1 conducting and tubes 2 and 3 non-conducting.

Actually, the foregoing steps involved in each change of state do not occur with the time separation indicated by the description. The external pulse acts to drive the circuit from a stable to an unstable condition and the regenerative action of the circuit causes it to move into a definite one of its other two states depending upon the state existing prior to the external pulse. The state selection is provided by the fact that the successive couplings between tubes, typified by the parallel combination of resistor 22 and capacitor 21 between anode 4 of tube 1 and grid 5 of tube 2, have greater time constants than the retrogressive couplings, typified by resistor 23 between anode 4 of tube 1 and grid 6 of tube 3.

When used as a counter, any of several known recording or indicating means may be employed. For example, glow lamps 24, 25, and 26 each in series with a respective current limiting resistor 27, 28 or 29 across anode resistors 7, 8 and 9 will each glow only when its associated tube is conducting to cause a potential difference across the anode resistor. Thus, armed with the knowledge of which glow tube is conducting prior to any input signal, the tube glowing after a series of input pulses (up to a total of 3) will give a positive indication of the number of pulses in the series. If an electrical rather than visual signal is desired, a differentiating circuit such as that comprising capacitor 30 and resistor 31 may be connected at the anode circuit of any of the three tubes and yield a single sharp positive pulse for every three input pulses at input terminals 16. This single positive pulse at terminals 32 will occur only when tube 3 is driven from a conducting to a non-conducting condition to establish one of the counter's three possible states.

In a readily apparent manner, a triode such as triode 33, may be placed across terminals 32 and employed to invert the positive pulses appearing at terminals 32 so that a series of three negative input pulses at terminals 16 causes a single negative pulse at terminals 16′. The negative pulses which appear at terminals 32 each time tube 3 is rendered conducting produce no output from tube 33 since it may be biased to cut off through resistor 34 to C− potential. Thus, the scale or scaling ratio of the counter of Fig. 1 is 3, which may be expected from a counter of the $3^n$ type having a single stage. If a second similar counter stage be connected with its input at 16′, it will be seen that a total of nine input pulses at terminals 16 will be required to yield a single output pulse at the second counter stage. Thus, when $n$ assumes a value of 2, $3^n$, the scaling ratio, becomes 9. Neglecting the interstage tubes, typified by triode 33, a total of six tubes (three to each stage) have been employed to produce a count of 9. If the six tubes had been arranged in a three stage $2^n$ type of counter, the count would only have been $2^3$ or 8. Similarly, $n$ counter stages of the type shown in Fig. 1 may be cascaded to provide a total count of $3^n$ which may have any value which is an integral power of 3.

Figure 2:
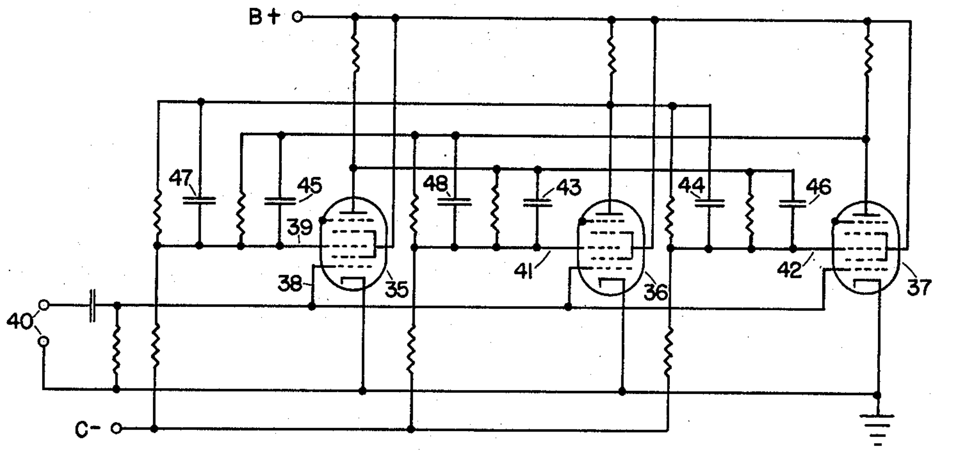
Fig. 2 is the circuit diagram of a variant embodiment of this invention.

The circuit of Fig. 1, while it illustrates one embodiment of this invention, has the disadvantage of requiring an interstage tube to eliminate pulses of the polarity opposite to that required for triggering purposes. Such opposite polarity pulses would disturb the stable condition of the next following stage at an undesired point in the counter cycle. Fig. 2 illustrates a counter of the $3^n$ type which is responsive to negative pulses but which will receive positive pulses without change of state. Thus, no interstage tube, such as tube 33, is required. In this circuit, as in the circuit of Fig. 1, substantial symmetry exists but multigrid tubes have been employed. One control grid of each of the tubes, typified by grid 38 of tube 35, is used only for triggering purposes, while the other control grid of each of the tubes, typified by grid 39 of tube 35, is used only for coupling between tubes in the manner heretofore described. Let it be assumed that the counter is in that state in which only tube 35 is conducting. Any positive pulses applied at terminals 40 have no effect upon tube 35 since that tube is already conducting. They are also powerless to render tubes 36 and 37 conducting since these tubes are held cut off by the potentials at respective control grids 41 and 42. Negative input pulses applied to terminals 40, however, render the conducting tube nonconducting and the cycle described in connection with Fig. 1 progresses to drive the counter into another state. Thus, several counter stages such as that shown in Fig. 2 may be cascaded merely by the use of intervening differentiating circuits (resistance-capacitance combination) and interstage tubes are not required.

It will be further noted in the circuit of Fig. 2 that capacitors are used in both the successive and retrogressive couplings between tubes. This does not interfere with the operation of the circuit provided the capacitors associated with the successive couplings (capacitors 43, 44, and 45) introduced a time constant substantially longer than the time constant introduced by the capacitors (46, 47, and 48) of the retrogressive couplings. This arrangement has the additional advantage of speeding up the regenerative action of the circuit in the manner of "compensating" capacitors in conventional $2^n$ type counters. It will be seen that, so long as the successive coupling has a substantially longer time constant, any suitable impedance means may be used for the retrogressive couplings.

Figure 3:
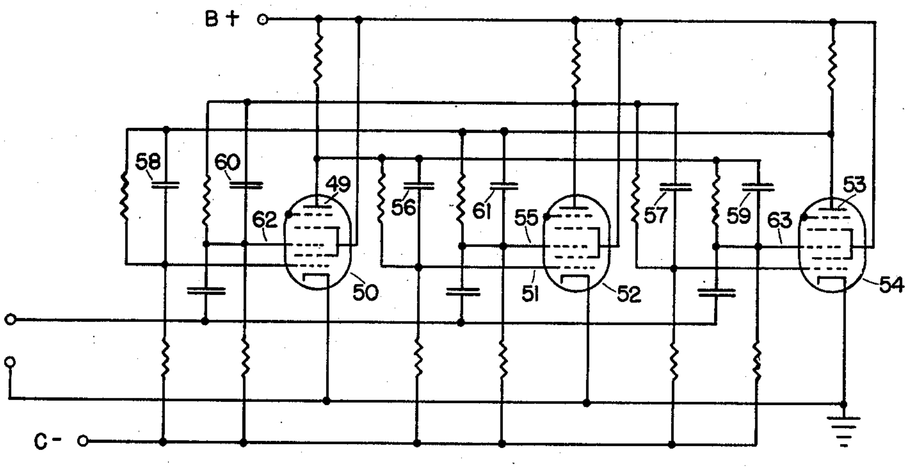
Fig. 3 is the circuit diagram of another variant embodiment of this invention.

It has been found that the circuits of Fig. 1 and Fig. 2 are somewhat sensitive to variations in supply potential and may have a tendency to oscillate under conditions of poor regulation. In Fig. 3 is shown a circuit more stable in this respect which, in the form shown, has the disadvantage of requiring an interstage tube as in the case of the circuit of Fig. 1. Successive and retrogressive couplings are connected to different control grids of each tube as typified by the connection of anode 49 of tube 50 to grid 51 of tube 52 and the connection of anode 53 of tube 54 to grid 55 of tube 52. The capacitors (56, 57, and 58) of the successive couplings again provide a longer time constant than the capacitors of the retrogressive couplings (59, 60 and 61). If the suppressor grids of tubes 50, 52 and 54 be used as holding grids and grids 55, 62, and 63 be employed solely as triggering grids, the circuit of Fig. 3 may be used for cascading without the interstage tube requirement.

To those versed in the art will occur various other changes certain of which have already been developed in connection with counters of the $2^n$ type. Typical of such possible changes are substitution of cathode biasing and resetting for an intermediate count. If a total count of six, or of twelve, or of eighteen be required without resetting, a counter or counters of the $3^n$ type herein disclosed may be cascaded with a counter or counters of the $2^n$ type.

Since certain further changes may be made in the foregoing constructions and different embodiments of the invention may be made without departing from the scope thereof, it is intended that all matter shown in the accompanying specifications shall be interpreted as illustrative and not in a limiting sense.

The invention described herein may be manufactured and used by or for the Government of the United States of America for governmental purposes without the payment of any royalties thereon or therefor.

What is claimed is:

1. An electronic counter of the scale-of-three type comprising, three vacuum tubes, means successively connecting the output of each of said tubes to the input of one of the other of said tubes so as to form a closed ring of cascaded amplifier tubes, means retrogressively connecting the output of each of said tubes to the input of one of the other of said tubes so as to form a closed ring of cascaded amplifier tubes in a sense opposite to that formed by said successive connecting means, said successive connecting means having greater time constants than said retrogressive connecting means, and means for applying input pulses from an external source to said three tubes in parallel.

2. An electronic counter of the scale-of-three type comprising, three vacuum tubes, means successively connecting the output of each of said tubes to the input of one of the other of said tubes so as to form a closed ring of cascaded amplifier tubes, means retrogressively connecting the output of each of said tubes to the input of one of the other of said tubes so as to form a closed ring of cascaded amplifier tubes in a sense opposite to that formed by said successive connecting means, said successive connecting means having greater time constants than said retrogressive connecting means, means biasing each of said tubes below cutoff except when both of the other of said tubes to which its input is connected are held non-conducting, and means for applying input pulses from an external source to said three tubes in parallel.

3. An electronic counter of the scale-of-three type comprising, three vacuum tubes, three substantially identical parallel combinations of resistance and capacitance successively connecting the output of each of said tubes to the input of one of the other of said tubes so as to form a closed ring of cascaded amplifier tubes, three substantially identical impedance means retrogressively connecting the output of each of said tubes to the input of the other of said tubes so as to form a closed ring of cascaded amplifier tubes in a sense opposite to that formed by said successive connecting combinations, said successive connecting combinations having greater time constants than said retrogressive connecting means, and means for applying input pulses from an external source to said three tubes in parallel.

4. An electronic counter of the scale-of-three type comprising, three vacuum tubes, three substantially identical parallel combinations of resistance and capacitance successively connecting the output of each of said tubes to the input of one of the other of said tubes so as to form a closed ring of cascaded amplifier tubes, three substantially identical impedance means retrogressively connecting the output of each of said tubes to the input of the other of said tubes so as to form a closed ring of cascaded amplifier tubes in a sense opposite to that formed by said successive connecting combinations, said successive connecting combinations having greater time constants than said retrogressive connecting means, means biasing each of said tubes below cutoff except when both of the other of said tubes to which its input is connected are non-conducting, and means for applying input pulses from an external source to said three tubes in parallel.

5. An electronic counter of the scale-of-three type comprising, three vacuum tubes each having at least an anode, a cathode, and a control grid, three substantially identical parallel combinations of resistance and capacitance successively connecting the output circuit of the anode of each of said tubes to the input circuit of the grid of one of the other of said tubes so as to form a closed ring of cascaded amplifier tubes, three substantially identical impedance means retrogressively connecting the output circuit of the anode of each of said tubes to the input circuit of the grid of one of the other of said tubes so as to form a closed ring of cascaded amplifier tubes in a sense opposite to that formed by said successive connecting combinations, said successive connecting combinations having greater time constants than said retrogressive connecting means, and means for applying input pulses from an external source to said three tubes in parallel.

6. An electronic counter of the scale-of-three type comprising, three vacuum tubes each having at least an anode, a cathode, and a control grid, three substantially identical parallel combinations of resistance and capacitance successively connecting the output circuit of the anode of each of said tubes to the input circuit of the grid of one of the other of said tubes so as to form a closed ring of cascaded amplifier tubes, three substantially identical impedance means retrogressively connecting the output circuit of the anode of each of said tubes to the input circuit of the grid of one of the other of said tubes so as to form a closed ring of cascaded amplifier tubes in a sense opposite to that formed by said successive connecting combinations, said successive connecting combinations having greater time constants than said retrogressive connecting means, means biasing each of said tubes below cutoff except when both of the other of said tubes to which its input is connected are held non-conducting, and means for applying input pulses from an external source to the input circuits of said three tubes in parallel.

7. An electronic counter of the scale-of-three type comprising, three vacuum tubes each having at least an anode, a cathode, a first control grid, and a second control grid, three substantially identical parallel combinations of resistance and capacitance successively connecting the output circuit of the anode of each of said tubes to the input circuit of the first control grid of one of the other of said tubes so as to form a closed ring of cascaded amplifier tubes, three substantially identical impedance means retrogressively connecting the output circuit of the anode of each of said tubes to the input circuit of the first control grid of one of the other of said tubes so as to form a closed ring of cascaded amplifier tubes in a sense opposite to that formed by said successive connecting combinations, said successive connecting combinations having greater time constants than said retrogressive connecting means, means connected to the first control grid of each of said tubes biasing each of said tubes below cutoff except when both of the other of said tubes to which its first control grid is connected as are held non-conducting, and means for applying input pulses from an external source to the second control grids of said three tubes in parallel.

8. An electronic counter of the scale-of-three type comprising, three vacuum tubes each having at least an anode, a cathode, a first control grid, and a second control grid, three substantially identical parallel combinations of resistance and capacitance successively connecting the output circuit of the anode of each of said tubes to the input circuit of the first control grid of one of the other of said tubes so as to form a closed ring of cascaded amplifier tubes, three substantially identical impedance means retrogressively connecting the output circuit of the anode of each of said tubes to the input circuit of the second control grid of one of the other of said tubes so as to form a closed ring of cascaded amplifier tubes in a sense opposite to that formed by said successive connecting combinations, said successive connecting combinations having greater time constants than said retrogressive connecting means, means connected to the first control grid of each of said tubes biasing each of said tubes below cutoff except when the other of said tubes to which said first control grid is connected is held non-conducting, means connected to the second control grid of each of said tubes biasing each of said tubes below cutoff except when the other of said tubes to which said second control grid is connected is held non-conducting and means for applying input pulses from an external source to the second control grids of said three tubes in parallel.

9. An electronic counter of the scale-of-three type comprising, a first, a second, and a third vacuum tube, coupling means regeneratively connecting the input and output of each of said tubes to the input and output of each of the other of said tubes so as to form a closed ring of regeneratively coupled amplifier tubes, said coupling means connecting the output of each of said tubes to the input of the successive tube in said ring in the order named having a greater time constant than said coupling means coupling the input of each of said tubes to the output of the successive tube in said ring in the order named, and means for applying input pulses from an external source to said first, second, and third vacuum tubes in parallel.

10. An apparatus having three distinct states for the counting of electrical impulses comprising, three vacuum tubes, means biasing each of said tubes so as to permit a different one of said tubes to conduct and so as to hold the other of said tubes below cutoff during each of the three states of the apparatus, means applying electrical impulses from an external source to said three tubes in parallel, said electrical impulses each reducing the conductivity of the particular tube conducting at the instant of its application, means applying the output signal of said particular tube to the input of each of the other of said tubes, last said means applying said output signal to one of said other tubes having a longer time constant than last said means applying said output signal to the other of said other tubes.

CONRAD H. HOEPPNER.

REFERENCES CITED

The following references are of record in the file of this patent:

UNITED STATES PATENTS

| Number | Name | Date |
|---|---|---|
| 1,972,535 | Page | Sept. 4, 1934 |
| 2,306,386 | Hollywood | Dec. 29, 1942 |
| 2,404,918 | Overbeck | July 30, 1946 |
| 2,405,664 | Mumma | Aug. 13, 1946 |
| 2,503,662 | Flowers | Apr. 11, 1950 |